United States Patent [19]

Lewis et al.

[11] Patent Number: 5,534,133
[45] Date of Patent: Jul. 9, 1996

[54] CONTINUOUS METHOD FOR INCREASING THE Q. I. CONCENTRATION OF LIQUID TAR WHILE CONCURRENTLY PRODUCING A Q. I. FREE TAR

[75] Inventors: Irwin C. Lewis; Ching F. Chang, both of Strongsville, Ohio; George E. Keller, II, South Charleston; Gary L. Gilleskie, Dunbar, both of W. Va.; Richard L. Shao, North Royalton, Ohio

[73] Assignee: UCAR Carbon Technology Corporation, Danbury, Conn.

[21] Appl. No.: 341,395

[22] Filed: Nov. 17, 1994

[51] Int. Cl.⁶ ..................................................... C10C 1/00
[52] U.S. Cl. ............................. 208/39; 208/45; 208/177; 210/281; 210/787
[58] Field of Search ........................... 208/39, 177, 45; 210/281, 787

[56] References Cited

U.S. PATENT DOCUMENTS

| | | | |
|---|---|---|---|
| 2,956,944 | 10/1960 | Logan et al. | 208/39 |
| 3,173,851 | 3/1965 | King et al. | 208/23 |
| 4,127,472 | 11/1978 | Migitaka et al. | 208/87 |
| 4,177,132 | 12/1979 | Uemura et al. | 208/22 |
| 4,183,802 | 1/1980 | Romey | 208/106 |
| 4,259,171 | 3/1981 | Stadelhofer et al. | 208/45 |
| 4,333,816 | 6/1982 | Kölling et al. | 208/91 |
| 4,436,615 | 3/1984 | Boodman et al. | 208/177 |
| 4,604,184 | 8/1986 | Cukier et al. | 208/22 |
| 4,954,240 | 9/1990 | Eidt, Jr. et al. | 208/50 |

OTHER PUBLICATIONS

K. Kai 3(1991) 166,290–Toho Gas, "Method for the Purification of Coal Tar and Coal Tar Pitch".

H. A. Kremer, Chemistry and Industry, pp. 702–713, Sep. 18, 1982, "Recent Developments in Electrode Pitch and Coal Tar Technology".

*Primary Examiner*—Helane Myers
*Attorney, Agent, or Firm*—Frederick J. McCarthy

[57] ABSTRACT

Continuous method for treating a liquid tar containing Q.I. solids to provide a liquid tar product having increased Q.I. concentration and, concurrently, a Q.I. free liquid tar product. The method utilizes cross-flow filter membranes.

5 Claims, 4 Drawing Sheets

CONTINUOUS METHOD FOR INCREASING THE Q. I. CONCENTRATION OF LIQUID TAR WHILE CONCURRENTLY PRODUCING A Q. I. FREE TAR

FIELD OF THE INVENTION

The present invention relates to a continuous method for treating a liquid tar containing Q.I. solids to provide a liquid tar product having increased Q.I. concentration and, concurrently, a Q.I. free liquid tar product. The method of the present invention utilizes cross-flow filter membranes.

BACKGROUND OF THE INVENTION

In the preparation of carbon artifacts such as graphite electrodes, a carbonaceous filler such as petroleum coke is admixed with a coal tar pitch binder and then formed, carbonized, and graphitized to produce a graphite product. For maximum product strength, it is important that the coal tar pitch binder give a good yield of carbon after carbonization. The presence of relatively high amounts of infusible carbon solids i.e. fine particles, generally called Q.I. (Quinoline Insoluble), is desirable for an effective binder in order to increase coking yield and to provide a source of fine carbon particles which also improve graphite artifact strength. Commercial coal tar binder pitches usually contain about 8–20% by weight Q.I. mainly in the form of small (micron) size spherulitic carbon particles. These particles, which are called natural Q.I., are generated during the preparation of the tar precursors used to produce the binder pitch. The Q.I. in pitches can also contain larger carbonaceous particles called cenospheres, carbonized coal particles, and inorganic ash. These components also originate in the preparation of the tar precursor and are generally not beneficial for use of the pitch as a binder. An additional form of Q.I. called secondary Q.I. or mesophase can be formed by heat treatment during the conversion of tar to pitch.

Very often, in order to increase strength, the carbon artifact is impregnated with molten pitch after baking, but before graphitization. The molten pitch impregnant fills the pores generated during the initial baking of the carbon article and increases final strength and density. In contrast to the requirements for binder pitch, an impregnant pitch should have very low or preferably zero amounts of solids (Q.I.). The presence of solid particles which are not miscible with the molten pitch would block the pores of the carbon article and prevent full impregnation of the pitch into the artifact.

It is presently difficult to produce impregnating pitches which are solids-free, i.e. Q.I. free. Conventional filtration or centrifugation of precursor coal tars can be used to remove the Q.I. particles prior to conversion to pitch. However, these operations are costly since they are batch operations and must be done at high temperatures. Additionally, the Q.I. particles must be separated from the solids-free tar and then disposed of. There is currently no domestic, i.e. United States source of a solids-free coal tar impregnating pitch. Batch processes have been developed in Japan for removal of Q.I. from coal tars to produce solids-free impregnating pitches (U.S. Pat. No 4,127,472) which involve treatment of the tar with an anti-solvent to settle the Q.I., followed by separation of the Q.I. by filtration or centrifugation. The separated Q.I. must then be disposed of. Japan published patent application 1(1989)-305,640 discloses the use of membrane filters to remove Q.I. solids from coal tar and coal tar pitch in a batch type procedure.

There is also difficulty obtaining high Q.I. content tars which are suitable for binder pitches. With increasing environmental controls, the coking operations used to produce the tars have been reduced in severity with a resulting reduction in the Q.I. levels in the tars. The derived pitches are, therefore, low in Q.I. and lead to reduced strength in graphite products when used as binder pitch. In Europe, Q.I. levels of binder pitch are generally below the minimum desired level of 8%. In order to increase the Q.I. content, processes have been developed in which artificial carbon fines are added back to the tar or pitch (U.S. Pat. No. 4,177,132).

For these reasons, it would be very advantageous to have a continuous process which could produce, at the same time, 0% Q.I. tars for impregnating pitches, and high Q.I. tars for binder pitches.

Over the last decade or so, an advanced form of ceramic membrane technology has become commercialized. This technology involves the use of ceramic monoliths, known as cross-flow filters, whose channel walls contain carefully controlled pore sizes. Pore sizes can be varied from somewhat above one micron down to 50 Angstroms.

These membranes operate in a fundamentally different manner from conventional dead-end filters. Instead of depositing the solids on a filter medium as occurs with dead-end filters, the feed stream flows across the surface of the membrane and the solids stay suspended in the liquid. The permeate or filtrate passes through the membrane and is collected.

SUMMARY OF THE INVENTION

Continuous method is provided for increasing the concentration of infusible solids (Q.I.) in a liquid Q.I. containing tar to a desired level to provide a Q.I. containing concentrate having an increased Q.I. level while providing a Q.I. free tar which method comprises: continuously introducing Q.I. containing liquid tar feed having a known Q.I. concentration into a circulation loop which includes, in series, a tar feed input, a cross-flow filtration membrane filter, an outlet for Q.I. containing concentrate which can be recirculated or collected, a pump and a flow controller to continuously circulate said feed in said circulation loop and obtain a Q.I. free permeate liquid tar exiting the circulation loop via said cross-flow filter at a desired permeate flow rate and a Q.I. containing liquid concentrate of a desired increased Q.I. concentration which passes through said cross-flow filter and circulates in the circulation loop; thereafter continuously, and concurrently with the introduction of additional tar feed into the circulation loop, withdrawing a portion of said Q.I. containing liquid concentrate from the circulation loop by way of said outlet for Q.I. containing concentrate.

DETAILED DESCRIPTION

Figure 1:
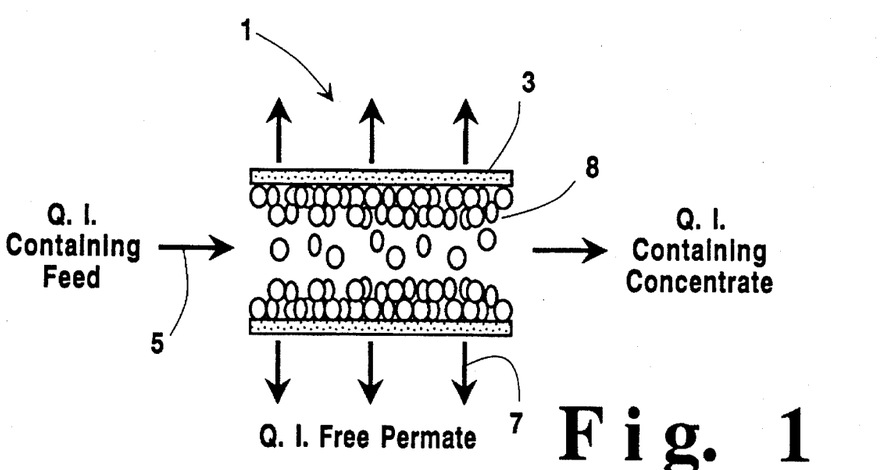
FIG. 1 is a schematic representation of a cross-flow ceramic membrane filter.

Filtration trials of tars were carried out using commercial tubular U.S. Filter ceramic membranes operating in a cross-flow configuration shown schematically at 1 in FIG. 1. A porous membrane indicated at 3 typically consists of selective layers of alpha alumina, zirconia, or gamma alumina deposited on an alpha alumina support. The substantial chemical stability offered by these materials makes ceramic membranes resistant to a wide range of organics, including the aromatics present in coal tar. In addition, ceramic membranes are stable at relatively high temperatures. When using undiluted tar, high temperature operation (i.e., >80° C.) is required to reduce the viscosity of a tar so that a practical filtration rate (i.e., permeation flux) may be attained.

In cross-flow filtration, illustrated schematically in FIG. 1, feed 5 flows parallel (rather than perpendicular) to the surface of membrane 3. The feed stream 5 is kept at a higher pressure than the permeate (i.e. filtrate) 7 so that a cross-flow of permeate passes through the pores of membrane 3. Particles larger than the membrane pores do not pass through the membrane and, hence, are rejected. The rejected particles, indicated at 8, form a thin layer at the membrane surface which increases the resistance to permeate flow. However, the parallel flow through the tube creates shear forces which keep this layer thin. Thus, a filter cake does not continuously accumulate with time as with dead-end filtration and the permeation flux reaches a substantially constant value. In practice, the flux may further decline after long-term, but at a much slower rate than the initial rate of flux decline due to cake formation and pore blockage.

In addition to chemical and thermal stability, ceramic membranes posses high strength and relatively strong bonds between the layers that make up the membrane. These properties allow ceramic membranes to be backflushed periodically in order to restore the permeation flux. Back-flushing involves reversing the flow of permeate through the membrane pores to essentially eliminate the layer of particles that has accumulated at the membrane surface.

Figure 2:
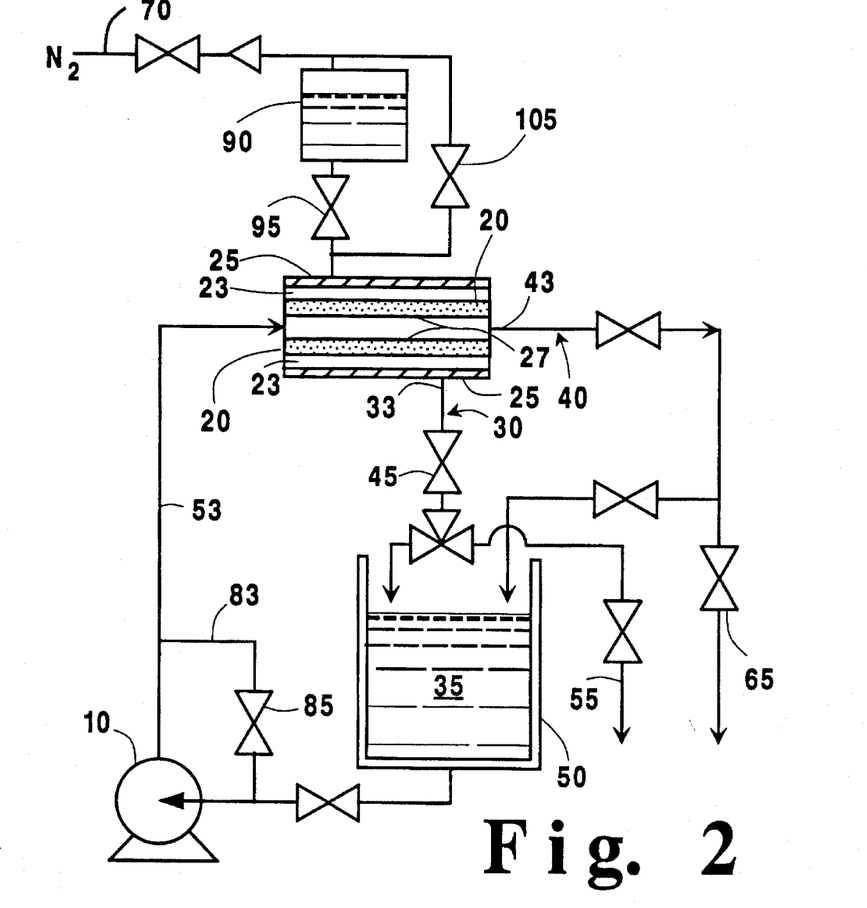
FIG. 2 shows an experimental system using a cross-flow ceramic membrane.

A schematic of the experimental apparatus used to investigate removal of Q.I. particles from coal tar is shown in FIG. 2. A rotary lobe positive displacement pump (Jabsco Pureflo Model A1) 10 was used to deliver liquid coal tar or a coal tar/toluene mixture 35, containing Q.I. particles, to a ceramic membrane filter 20. A bypass line, 83, containing a valve, 85, was used to regulate the flow rate to the membrane. Feed pressures between 40 and 60 psig, and feed flow rates between three and seven gpm (gallons per minute) were used in the investigation. The feed delivered to membrane 20 is divided into two streams by the membrane: a concentrate 40 having increased Q.I. content, and a permeate 30 which is Q.I. free. The concentrate stream 40 is returned to the feed tank 50 as indicated or can be withdrawn through valve 65. Due to axial pressure drop in the tubular membrane 20, the pressure of the concentrate stream at the exit of the membrane 20 is typically 10–30 psi less than the feed pressure at the inlet to membrane 20. The pressure of permeate stream 30, is maintained at 0 psig, and can be returned to the feed tank 50, or removed from. the system as indicated at 55. By recycling both the concentrate 40 and permeate 30, a constant particle concentration in the feed could be maintained during the trials and removal of a portion of permeate 30 results in an increase of the concentration of Q.I. particles in the concentrate.

To provide heat to the system, the feed tank 50, the tubing 53 between the feed tank and the membrane 20, the pump 10, the concentrate line 43 and the permeate line 33 were conventionally traced with electrical tape (not shown) and insulated. The temperature in the tank was controlled with an Athena temperature controller (not shown). The heat input to the pump 10 and the process lines was controlled by varying the voltage input to the heat tape with a Variac (not shown). Temperatures were monitored with thermocouples in the feed tank, the concentrate stream, and the permeate line. Back flushing to remove accumulated solids on membrane 20 was accomplished by two procedures. In one procedure, valve 45 is closed, valve 95 is opened and a 15 second pulse of nitrogen from line 70 is applied at a pressure which is 20 psi greater than the feed pressure which causes pure toluene to flow from tank 90 to fill the interior 23 of membrane housing 25 and to flow across membrane 20 to remove particles accumulated on its inner surface 27. In another procedure, valve 45 is closed, valve 105 is opened and a 15 second pulse of nitrogen from line 70 is applied at a pressure which is 20 psi higher than the feed pressure causing permeate tO flow across membrane 20 to remove particles accumulated on its inner surface 27.

In each trial using the system of FIG. 2, three to five gallons of feed 35 were charged tO the system. Four different feeds were used in the trials: a commercial coal tar (A) containing 2.4 wt. % Q.I., a commercial coal tar (B) containing 5.0 wt. % Q.I., a 1 to 1 blend by weight of coal tar (A) in toluene and a 1 to 1 blend by weight of coal tar (B) in toluene. In addition to Q.I. content, tar (A) and tar (B) also differ in viscosity. The following examples 1–4 show results of the investigation:

EXAMPLE 1

TEST MATERIALS (TARS)
 a) Coal Tar A—A commercial tar derived from coal coking processes with the following properties:
  Q.I.=2.4 wt %
  Coking Yield=25.7 wt %
  Ash=0.10 wt %
 Viscosities at different temperatures are:
 746 cps at 55° C.
 101 cps at 80° C.
 27 cps at 105° C.
 The average molecular weight measured by gel permeation chromatography (GPC) was 316.
 The Q.I. size as observed by SEM and measured by light scattering ranged from about 0.3 to 10 microns with an average size of 2.7 microns.
 b) Coal Tar B
  Q.I.=5.0 wt %
  Coking Yield=27.1 wt %
  Ash=0.13 wt %
 Viscosity at different temperatures are:
 55° C.=117 cps
 80° C.=32 cps
 105° C.=13 cps
 130° C. =7 cps
 Average Molecular Weight=345
 Q.I. Size Range=0.1–3 Microns Average Size of Q.I.=0.8 Micron

EXAMPLE 2

FILTRATION OF A DILUTED COAL TAR USING A 0.2 MICRON MEMBRANE

Commercial coal tar B containing 5.0 wt % Q.I. was blended with toluene to produce a 50/50 weight % mixture of coal tar/toluene. About 12,000 grams of this blend was charged to the system of FIG. 2 operating at 68° C. The Q.I. content of the blend was 2.5 wt %. A ceramic membrane with an average pore size of 500 Angstroms (0.05 micron) was used for the filtration. The coal tar was recycled through the membrane and varying amounts of solids-free permeate were removed. The Q.I. level of the tar toluene mixture was measured as a function of the amount of permeate removed. The results are summarized in FIG. 3 which shows that the Q.I. was concentrated from 2.5 wt % to 3.1 wt % by removing 2100 ml of permeate (approximately 20 wt %). Analysis of the permeate showed it to contain 0.0 wt % Q.I.

Figure 3:
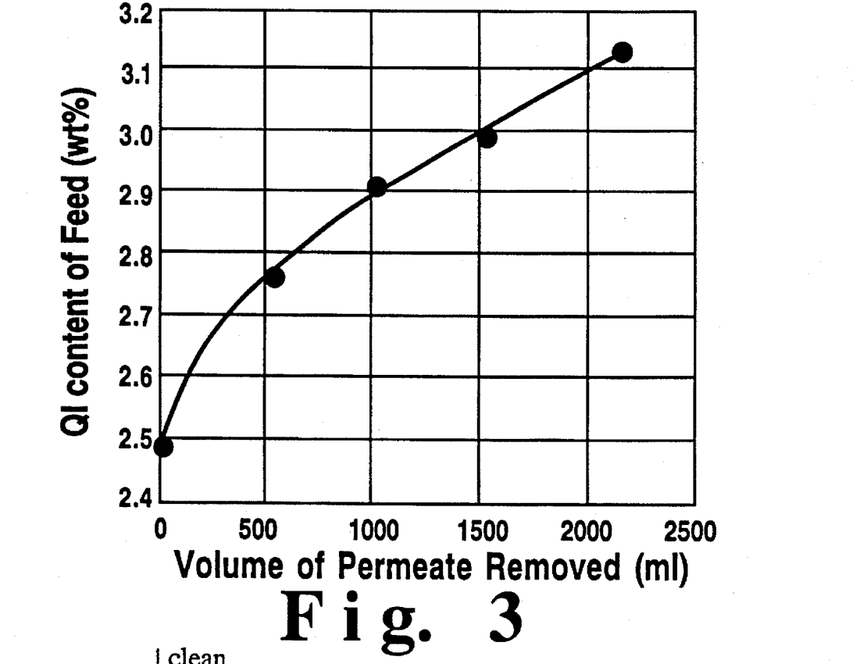
FIGS. 3–6 show graphs of results obtained using the experimental system of FIG. 2.

The concentrated Q.I. level was as predicted from the amount of permeate removed:

2.5 wt %/0.80=3.1 wt %

EXAMPLE 3

FILTRATION OF TOLUENE DILUTED TARS (A) AND (B) USING 0.2 AND 0.1 MICRON PORE SIZE MEMBRANES

Filtration tests were carried out using the system of FIG. 2 and ceramic membranes with average pore sizes of 0.2 and 0.1 micron. Although membranes with pores 0.2 micron in size and larger can be used to produce a solids-free permeate, these membranes could not be satisfactorily operated in a continuous flow/backflush manner to concentrate the Q.I.

Figure 4:
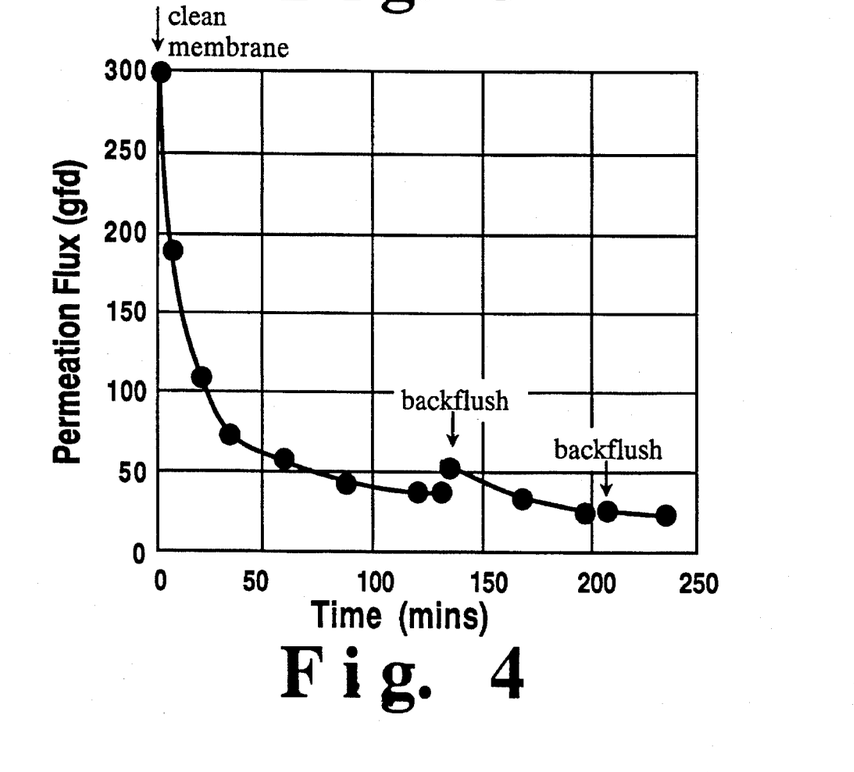

For this example, the coal tar "A" containing a 2.4 wt % Q.I. was diluted 50/50 weight % with toluene and filtered through a 0.2 micron pore size membrane operating at 80° C. and using a flow rate of 3.9 gpm. The results are shown in FIG. 4 along with the other operating parameters. The initial permeate flux was very high at 300 gfd, but after two hours, it had dropped to only 37 gfd (gallons/ft$^2$/day)(factor of eight).

The first data point shown in FIG. 4 was taken immediately after exposing the clean membrane to the feed. This figure shows a sharp decrease in the permeate flux early in the run followed by a slower decrease (i.e., leveling off) in the permeate flux as the run continued. The initially sharp decrease in permeate flux is typical of cross-flow filtration processes and is usually attributed to the buildup of particles at the surface of the membrane in contact with the feed. The permeate flux levels off with time as the layer of retained solids reaches a constant thickness. If particle accumulation at the membrane surface were responsible for the decline in permeate flux, then backflushing should have temporarily increased the permeate flux. However, as shown in FIG. 4, backflushing with toluene had a negligible effect on the measured permeate flux. There are two possible explanations for the ineffectiveness of backflushing in this case: (i) the backflush pressure was too small to remove a significant amount of retained solids; and (ii) irreversible internal membrane fouling occurred. If internal fouling of the membrane were great enough, the membrane could offer a significantly larger resistance to permeate flow than the filter cake, and backflushing would have a negligible effect on the flux values measured.

Figure 5:
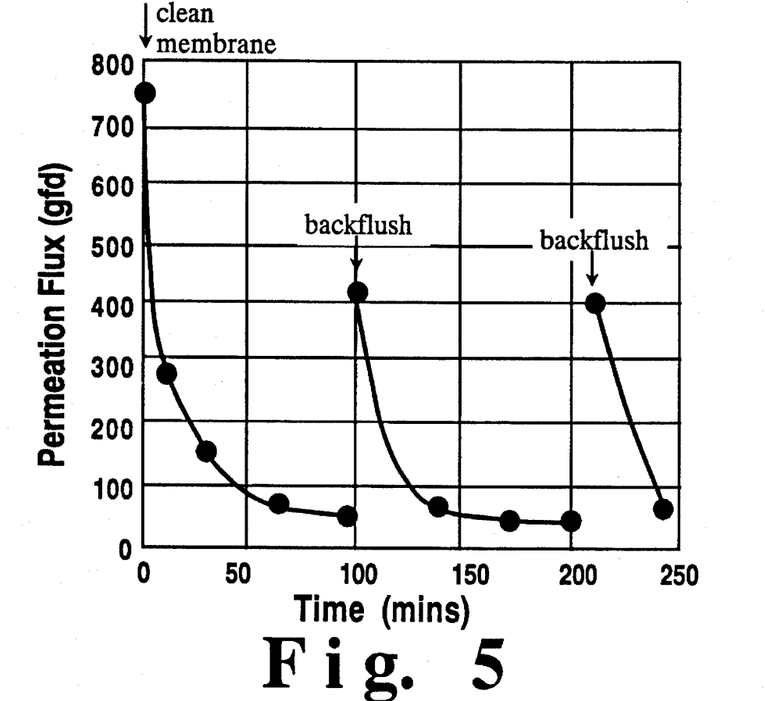

A similar run was performed with a 0.1 micron pore size column and the results are shown in FIG. 5. The initial permeation flux was a high 771 gfd. After 100 minutes, the flux declined to about 54 gfd. When the membrane was backflushed with toluene, the flux was increased to 419 gfd. After another 100 minutes of operation, the flux decreased 45 gfd, but was restored to 428 gfd by backflushing. These data show that unlike the 0.2 micron membrane, the 0.1 micron membrane was not irreversibly clogged with solids and that the system could be practically operated in a continuous manner with periodic backflushing. In each instance, the permeate removed contained 0 wt % solids. Results of these tests show that pore sizes of 0.1 micron or less are needed to prevent entrapment of the solids into the pores and enable continuous operation employing backflushing.

TABLE I

Data for FIG. 4

| Time (mins) | Backflush | Temp (C.) | Pressure (psig) Inlet | Outlet | Perm Flux (gfd) |
|---|---|---|---|---|---|
| 0 | | 72 | 40 | 30 | 296.6 |
| 12 | | 80 | 40 | 33 | 187.2 |
| 22 | | 79 | 40 | 33 | 107.1 |
| 37 | | 79 | 40 | 33 | 70.1 |
| 62 | | 80 | 40 | 33 | 53.5 |
| 92 | | 80 | 40 | 33 | 39.9 |
| 122 | | 80 | 40 | 33 | 37.3 |
| 137 | ✓ | 80 | 40 | 33 | 51.4 |
| 167 | | 80 | 40 | 33 | 34.3 |
| 197 | | 80 | 40 | 33 | 25.7 |
| 204 | ✓ | 79 | 40 | 33 | 26.6 |
| 234 | | 80 | 40 | 33 | 23.4 |

Feed: 50 wt % Coal Tar (B), 50 wt % Toluene
Feed Flow Rate: 3.9 gpm

TABLE II

Data for FIG. 5

| Time (mins) | Backflush | Temp (C.) | Pressure (psig) Inlet | Outlet | Perm Flux (gfd) | Perm QI wt % |
|---|---|---|---|---|---|---|
| 0 | | 82 | 40 | 34 | 771.1 | |
| 15 | | 81 | 40 | 36 | 275.4 | |
| 35 | | 80 | 40 | 36 | 142.8 | 0 |
| 65 | | 80 | 40 | 36 | 66.0 | |
| 95 | | 80 | 40 | 36 | 53.6 | |
| 100 | ✓ | 80 | 40 | 35 | 419.1 | 0 |
| 140 | | 80 | 40 | 36 | 68.9 | 0 |
| 170 | | 80 | 40 | 35 | 47.0 | |
| 200 | | 80 | 40 | 35 | 44.8 | 0 |
| 205 | ✓ | 80 | 40 | 35 | 428.4 | |
| 245 | | 80 | 40 | 36 | 60.2 | 0 |

Feed: 50 wt % Coal Tar (A), 50 wt % Toluene
Feed Flow Rate: 3.0 gpm

EXAMPLE 4

FILTRATION USING A 0.1 MICRON MEMBRANE AND BACKFLUSHING WITH PERMEATE

To avoid backflushing with a fluid whose composition was different than that of the feed, several trials were performed using permeate as the backflush fluid. A Plot showing the permeation flux versus time for this run is given in FIG. 6. The run was carried out with a 50/50 (by weight) mixture of tar (B) and toluene and a 1000 (0.1 micron) Angstrom membrane.

Figure 6:
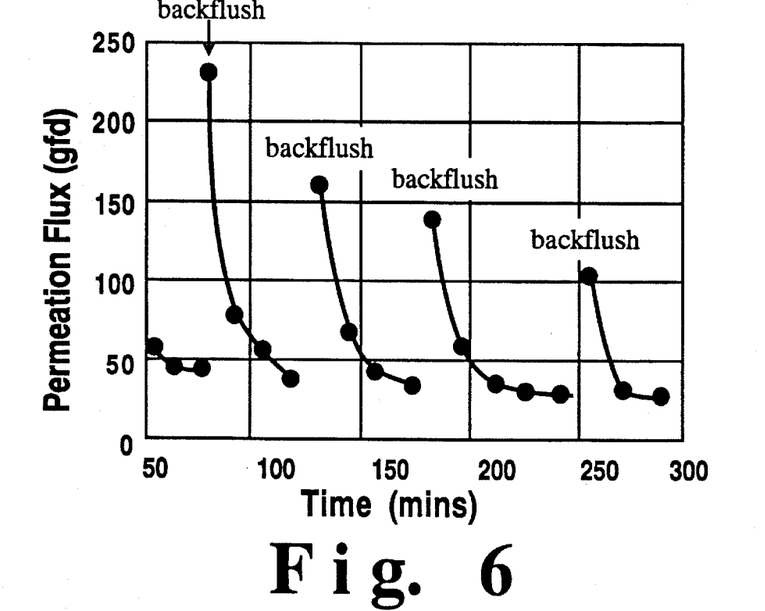

The results in FIG. 6 show that early in the run, this mechanism of backflushing produced large increases in the flux across the 1000 (0.1 micron) Angstrom membrane. However, as the run proceeded, backflushing had a diminishing effect on the permeation rate, indicating that irreversible internal fouling may have occurred during the course of the run.

EXAMPLE 5

FILTRATION OF UNDILUTED COAL TAR USING 0.05 MICRON PORE SIZE MEMBRANE

Since it would be more economical to carry out the Q.I. concentration/removal with pure undiluted tar, experiments were carried out with pure tar (B) using a 0.05 micron (500 Angstrom) ceramic filter. This size filter would have a reduced chance of pore plugging with the Q.I. particles. Experiments were carried out at temperatures of 80°–90° C. where the tar would have a viscosity of 32 cps or lower. The results are summarized in Table III.

The values listed for the permeation flux in Table III are values averaged over the course of a run. Trends such as that shown in Example 3 in which the flux was high at the beginning of the run and leveled off as the run proceeded were not observed with the undiluted tars; that is, the flux remained approximately constant throughout the run. Hence, the flux values reported in Table III should be considered steady-state values.

The results shown in Table III indicate that the 500 Angstrom membrane was able to produce a solids-free permeate during all runs, and that by removing permeate from the system rather than returning it to the feed tank, it was possible to concentrate Q.I. particles in the feed stream. This Table III also shows the effect of various operating conditions on the permeation flux. For example, a comparison between run 3-GLG-X-13 and 3-GLG-X-14 indicates that an increase in the feed flow rate results in an increased permeation flux across the membrane. This result is expected since high flow rates result in a thinner filter cake at the membrane surface.

In addition to runs with undiluted tar (B), runs with undiluted tar (A) were also performed. This tar has a higher viscosity. Table IV lists the results from runs made with undiluted tar (A). Also shown in the table are results from runs with undiluted tar (B) and a 50/50 (by weight) mixture of tar (A) and toluene. The flux values measured for the tar (A) are smaller than those measured for either the undiluted tar (B) or the 50/50 (by weight) mixture of tar (B) with toluene. These data demonstrate the strong dependence of flux on viscosity. The flux measured for the tar (A)/toluene mixture has a value of 25.5 gfd and since the tar constitutes 50 wt % of the mixture, the flux of tar (A) is about half of the total flux. Thus, higher fluxes of coal tar are obtained when the feed is diluted.

The method of the invention is operable with tar having a viscosity as high as 500 cps; a preferred tar viscosity for increased through put is 50 cps or less. Such lower viscosities are obtainable by heating the tar to a suitable temperature suitable for the particular tar; alternatively a solvent can be added to the tar, as disclosed herein, in amounts of 20 to 80% by weight.

Operation of the method at temperatures as low as room temperature is achievable by diluting the coal tar with a suitable solvent such as toluene, benzene, pyridine chlorobenzene, trichlorobenzene, coal tar petroleum distillate oils, anthracene oil and the like.

TABLE III

Summary of Results for the Filtration of Undiluted Tar (B) with a 500 Angstrom Membrane

| Run | Temp (C.) | Pressure (psig) | | Flow Rate (gpm) | Perm Flux (gfd) | Q. I. Content (wt %) | |
|---|---|---|---|---|---|---|---|
| | | Inlet | Outlet | | | Feed | Permeate |
| 3-GLG-X-12 | 80 | 40 | 27 | 4.9 | 5.6 | 5.0 | 0 |
| 3-GLG-X-13 | 90 | 60 | 46 | 5.2 | 9.0 | 5.0 | 0 |
| 3-GLG-X-14 | 90 | 60 | 30 | 7.7 | 13.2 | 5.0 | 0 |
| 3-GLG-X-17a | 90 | 60 | 30 | 7.7 | 11.9 | 5.1 | 0 |
| 3-GLG-X-17b | 90 | 60 | 30 | 7.7 | 10.5 | 5.2 | 0 |
| 3-GLG-X-18 | 90 | 60 | 30 | 7.7 | 8.2 | 5.8 | 0 |

TABLE IV

Summary of Results for the Filtration of Undiluted Tar (A) with a 500 Angstrom Membrane

| Run | Feed | Temp (C.) | Pressure (psig) | | Flow Rate (gpm) | Perm Flux (gfd) | Q. I. Content (wt %) | |
|---|---|---|---|---|---|---|---|---|
| | | | Inlet | Outlet | | | Feed | Permeate |
| 3-GLG-X-49 | Tar (A) | 110 | 60 | 30 | 5.9 | 1.8 | 2.4 | 0 |
| 3-GLG-X-50a | Tar (A) | 110 | 60 | 30 | 5.9 | 1.4 | 2.4 | 0 |
| 3-GLG-X-50b | Tar (A) | 110 | 60 | 30 | 5.9 | 1.1 | 2.4 | 0 |

TABLE IV-continued

Summary of Results for the Filtration of Undiluted Tar (A) with a 500 Angstrom Membrane

| Run | Feed | Temp (C.) | Pressure (psig) Inlet | Pressure (psig) Outlet | Flow Rate (gpm) | Perm Flux (gfd) | Q. I. Content (wt %) Feed | Q. I. Content (wt %) Permeate |
|---|---|---|---|---|---|---|---|---|
| 3-GLG-X-19 | 50/50 Tar (A)/ Toluene | 80 | 40 | 32 | 4.0 | 25.5 | 1.2 | 0 |
| 3-GLG-X-14, 15, 16, 17, 18 | Tar (B) | 90 | 60 | 30 | 7.7 | 8 to 14 | 5 | 0 |

Figure 7:
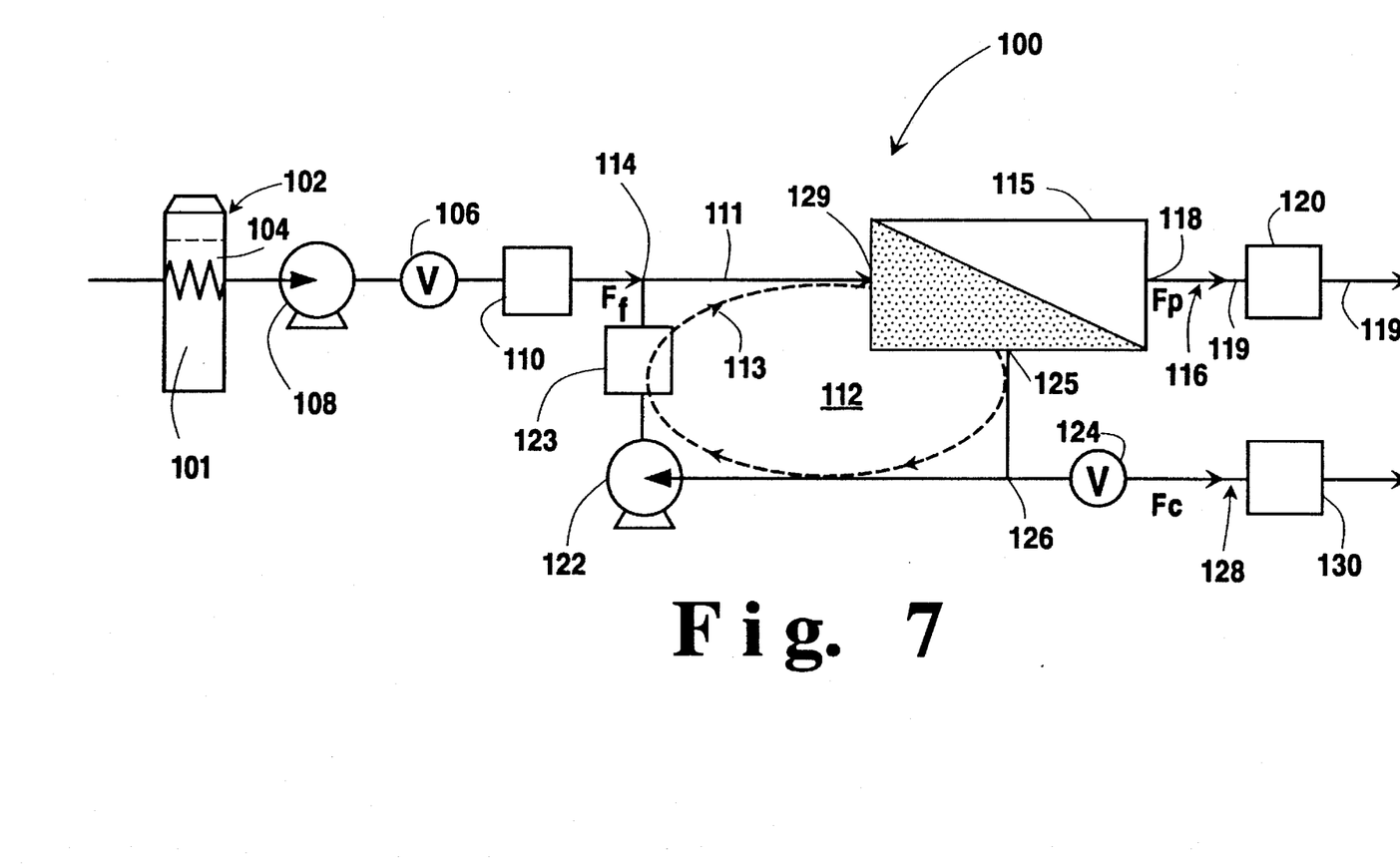
FIG. 7 shows a system in accordance with the present invention for the continuous concentration of Q.I. containing tar with the concurrent production of Q.I. free tar.

With reference to FIG. 7, a schematic for a continuous-operation Q.I. particle filtration and concentration unit for processing Q.I. containing liquid tar is shown at 100. The unit 100 comprises a pre-heater 102 which contains Q.I. containing tar feed material 104. The tar feed material 104 is heated to a temperature in the range of 80°–320° C. in order to reduce the viscosity to a minimum value without the occurrence of volatilization or chemical reaction in the tar (see Example I for tar (A) and tar (B)). The particular temperature for minimum viscosity for different tars will vary and is determined by routine measurement. With valve 106 open, tar feed 104 is moved by pump 108 and mass flow controller 110 into circulation loop 112 through loop inlet 114. The fresh Q.I. containing tar feed thus introduced into circulation loop 112 passes by way of conduit 111 into the inlet 129 of membrane filter 115 and a Q.I. free liquid tar permeate 116 exits filter 115 at 118, and the Q.I. containing concentrate exits the membrane filter 115 at 125. A desired Q.I. free liquid tar permeate flow rate is established by regulation of mass flow controller 120 while correspondingly adjusting the flow of tar feed into circulation loop 112 at 114 so that the amount (quantity) of tar being circulated in loop 112 remains substantially constant while being repeatedly circulated as shown at 113 at a high rate of flow in loop 112, by high pressure pump 122 in conjunction with mass flow controller 123. In the course of the repeated circulation of liquid tar in loop 112, the concentration of Q.I. in this circulating liquid tar is increased due to permeate removal from loop 112. With a desired Q.I. free permeate flow rate established at 116 in conduit 119, valve 124 is opened and liquid tar concentrate 128, i.e. tar of higher Q.I. concentration than feed 104, is withdrawn from circulation loop 112 at outlet 126. That is, the Q.I. concentration in the liquid tar circulating in the portion of loop 112 between the exit 125 of filter 115 and feed inlet 114, $C_1$, is the same as the Q.I. concentration, $C_c$, in the liquid tar concentrate 128. The flow of liquid tar concentrate (high "Q.I.") 128 is regulated at mass flow controller 130 and the amount of tar feed introduced at 114 into circulation loop 112 before filter 115 is correspondingly increased.

The Q.I. concentration and flow rate of the tar concentrate withdrawn from the circulation loop at 126 is determined by the following relationship:

$$C_c = \frac{C_f \times F_f}{F_f - F_p} \quad (I)$$

$$F_f - F_p = F_c \quad (II)$$

where $C_c$=Q.I. concentration in weight percent in the tar concentrate (128)

$C_f$=Q.I. concentration in weight percent in the tar feed (104)

$F_f$=the flow rate of the tar feed (104)

$F_p$=the flow rate at which Q.I. free permeate (116) exits filter and circulation loop $F_c$=the flow rate at which tar concentrate (128) is withdrawn from the circulation loop Example 6 will serve to further illustrate the preferred embodiment of FIG. 7.

EXAMPLE 6

(Hypothetical)

CONTINUOUS PROCESS FOR Q.I. CONCENTRATION

A continuous microfiltration plant for Q.I. concentration in liquid tar and concurrent production of Q.I. free tar is shown in FIG. 7 at 100. Ceramic. membrane filter 115 (U.S. Filter) is housed inside a stainless-steel case and has a nominal pore diameter of 500 angstrom and a total surface area of 75 ft$^2$. The fresh feed of coal tar 104 is preheated to between 80° and 350° C. to minimize viscosity and pumped into the "circulation" process loop 112 which includes a large WAUKESHA positive displacement pump 122, the U.S. Filter ceramic membrane module 115 and a MICRO MOTION mass flow controller 123. The temperature of the circulation process loop is likewise maintained at the minimum viscosity temperature between 80° and 320° C. using hot oil tracing.

The flow rates of fresh feed 104, permeate 116, concentrate 128, and recirculation 113 are respectively regulated by MICRO MOTION mass flow controllers 110, 120, 130, and 123. The flow rates of fresh feed 104 and concentrate 128 are controlled according to the initial Q.I. level in the fresh coal tar feed 104, the desired Q.I. level of the concentrate 128, and the flow rate of permeate 116. The flow rate of coal tar 111 inside the circulation loop 112 is maintained very high, $10^2$–$10^4$ times the flow rate of the fresh feed 104, in order to create and maintain a turbulent flow inside the tubular ceramic membrane.

A material balance of the system with permeate from the membrane filter being Q.I. free gives the following:

$$F_f = F_p + F_c \quad (1)$$

$$F_f \times C_f = F_p \times C_p + F_c \times C_c = F_c \times C_c \, (C_p = 0) \quad (2)$$

where $F_f$, $F_p$, and $F_c$ denote the respective flow rates of the fresh feed, permeate, and concentrate and $C_f$, $C_p$ and $C_c$ denote the solid wt. % correspondingly. As indicated in previous examples, with cross-flow filters, $C_p$ is equal to zero; i.e., the permeate is Q.I. free.

From previously noted Table III, the filtration rate, i.e., the permeation flux, is approximately 10 gallon/ft²/day (gfd) for filtering a undiluted coal tar (B) with the use of a 500-Angstrom membrane. The steady-state permeation flow rate, $F_p$, is determined as follows:

$F_p$=(permeate flux)×(filter surface area)

$F_p$=10 gallons/ft²/day×75 ft²

$F_p$=750 gallons permeate/day=31.3 gallons permeate/hr.

If the fresh feed has 1 wt. % solids (Q.I.) $C_f$, concentrating the tar to contain 3, 4, and 5 wt. % Q.I. solids can be achieved by operating the system according to the following sets of conditions:

| $C_f$ = 1 wt. % | $C_c$ = Solid wt. % in the Concentrate | | |
|---|---|---|---|
| | 3 wt. % | 4 wt. % | 5 wt. % |
| Fresh Feed Rate, Gallons/Hr. - $F_f$ | 46.9 | 41.7 | 39.1 |
| Permeate Rate, Gallons/Hr. - $F_p$ | 31.3 | 31.3 | 31.3 |
| Concentrate Rate, Gallons/Hr. - $F_c$ | 15.6 | 10.4 | 7.8 |

Similarly, concentrating a 1.5 wt. %—solid feed 3, 4, and 5 wt. % tars requires the following operation conditions:

| $C_f$ = 1.5 wt. % | $C_c$ = Solid wt. % in the Concentrate | | |
|---|---|---|---|
| | 3 wt. % | 4 wt. % | 5 wt. % |
| Fresh Feed Rate, Gallons/Hr. - $F_f$ | 62.6 | 50.0 | 44.7 |
| Permeate Rate, Gallons/Hr. - $F_p$ | 31.3 | 31.3 | 31.3 |
| Concentrate Rate, Gallons/Hr. - $F_c$ | 31.3 | 18.7 | 13.4 |

In the foregoing exemplary situations with valve 124 closed, the fresh feed rate $F_f$ is adjusted until the permeate rate $F_p$ (which is equal to $F_f$) reaches 31.3 gallons per hour, and the circulation in loop 112 is about 100,000–300,000 gallons per hour. There is no flow of concentrate from circulation loop 112 since valve 124 is closed. Upon attaining a constant permeate flow rate $F_p$ of 31.3 gallons per minute, valve 124 is opened and tar concentrate is withdrawn from circulation loop 112 at the rate $F_c$ corresponding to the desired Q.I. concentration $C_c$ by operation of mass flow controller 130; concurrently, the fresh feed flow rate $F_f$ is increased by amount of withdrawn tar concentrate, $F_c$.

What is claimed is:

1. Continuous method for increasing the concentration of infusible solids (Q.I.) in a Q.I. containing liquid tar to a desired level while simultaneously producing a Q.I. free permeate which comprises: continuously introducing Q.I. containing liquid tar feed having a known Q.I. concentration into a circulation loop which includes, in series, a cross-flow filtration membrane filter, a pump and a flow controller to continuously circulate said feed in said circulation loop to obtain (i) a Q.I. free permeate liquid tar product exiting the circulation loop via said cross-flow filter at a desired known permeate flow rate and (ii) a Q.I. containing liquid concentrate product of increased Q.I. concentration compared to the liquid tar feed which passes through said cross-flow filter and circulates in the circulation loop; thereafter continuously, and concurrently with the introduction of additional Q.I. containing liquid tar feed into the circulation loop, withdrawing a portion of said Q.I. containing liquid concentrate of increased Q.I. concentration from the circulation loop, the flow rate of the additional Q.I. containing liquid tar feed being the same as the flow rate of the Q.I. containing concentrate product withdrawn from the circulation loop and maintaining the relationship between Q.I. concentrations and flow rates as follows:

$$\begin{array}{l}\text{Q.I. Concentration} \\ \text{of Concentrate} \\ \text{Portion withdrawn} \\ \text{from Circulation} \\ \text{Loop}\end{array} = \begin{array}{l}\text{Q.I. Concentration} \\ \text{of Feed Introduced} \\ \text{into Circulation} \\ \text{Loop}\end{array} \times \frac{\text{Feed Flow Rate}}{\text{Feed Flow Rate} - \text{Permeate Flow Rate}}$$

2. Method in accordance with claim 1 wherein the liquid tar feed, permeate liquid, and liquid concentrate in the circulation loop are maintained in the temperature range of 80° to 320° C.

3. Method in accordance with claim 1 wherein the liquid concentrate in the circulation loop is circulated at a rate which is $10^2$–$10^4$ times the flow rate of the liquid tar feed in order to establish turbulent flow in the circulation loop.

4. Method in accordance with claim 1 wherein said membrane filter is a ceramic membrane filter having a pore size of 0.1 micron or less.

5. Method in accordance with claim 1 wherein said tar feed is diluted with a solvent to reduce viscosity of the tar feed and enable operation of the method at room temperature.

* * * * *